No. 861,731. PATENTED JULY 30, 1907.
J. KAMINSKI.
WAGON BRACKET.
APPLICATION FILED MAR. 4, 1907.
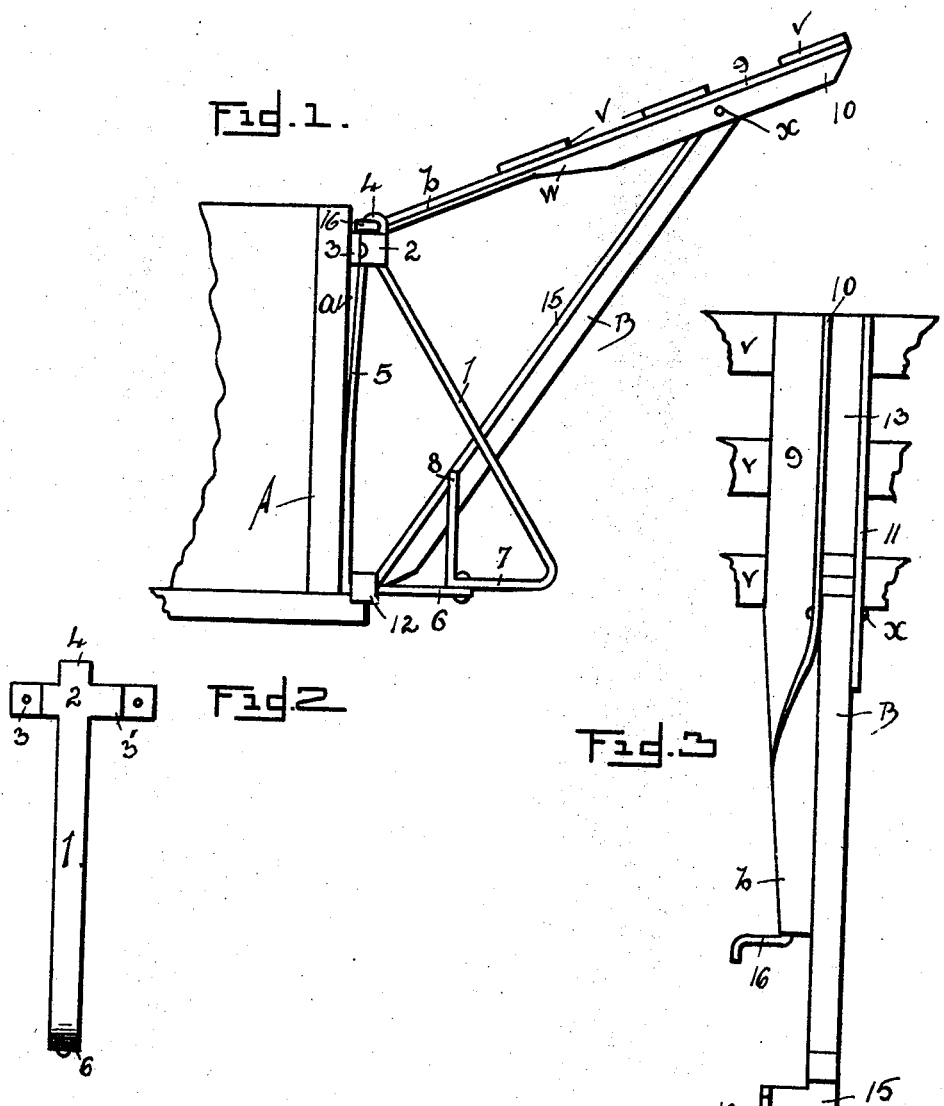
WITNESSES:
D. J. Sues
J. Sues.
INVENTOR
John Kaminski
BY Geo. W. Sues. Attorney

UNITED STATES PATENT OFFICE.

JOHN KAMINSKI, OF HILLIARDS, MICHIGAN.

WAGON-BRACKET.

No. 861,731.  Specification of Letters Patent.  Patented July 30, 1907.

Application filed March 4, 1907. Serial No. 360,625.

*To all whom it may concern:*

Be it known that JOHN KAMINSKI, a citizen of the United States, residing at Hilliards, in the county of Allegan and State of Michigan, have invented certain new and useful Improvements in Wagon-Brackets, of which the following is a specification.

This invention relates to a simple adjustable bracket, adapted to be secured to the side of an ordinary farm wagon, and be provided with suitable slats, to form a stock rack, or a hay rack permitting two adjustments.

In the accompanying drawings, I show in Figure 1, a broken portion of a wagon disclosing one of my brackets, adjusted to its lowest extreme position, Fig. 2 shows a front detached detail of the bracket proper, while Fig. 3, shows a detached detail of the rack arm and stay as used in my invention.

For the purposes of economy and in order to save time, it is highly desirable, that an ordinary farm wagon be adapted to the various needs of the farmer. With this aim in view I have constructed a simple bracket that may be secured to any ordinary farm wagon, and to which suitable slats are secured, so that the brackets may be adjusted to form a stock rack or a hay rack, while the brackets are readily detachable, so that the wagon may be used for ordinary purposes.

In carrying out the aim of my invention, I construct an approximately triangular bracket as is shown in Fig. 1, made of any suitable material, such as strap steel or iron, and which comprises the base portion 6, from which extends at right angles the section 5, ending in the recurved ear 4, having the securing loop 2, from which extend the securing ends 3, 3, as shown in Fig. 2. The bracket being continued in the straight portion, is then bent at an angle to form the base portion 1, and is then continued in the stop end 8, as shown in Fig. 1. This bracket is secured to the side of an ordinary farm wagon A, as shown in Fig. 1, by means of suitable bolts. Interposed however between the bracket and the wagon, near the upper end, is the wedge $a$, disclosed in Fig. 1, so that the upper end of the bracket portion 5, projects from the wagon box, to form a shoulder, against which the hook end 16 of the rack arm 9 rests. This rack arm is preferably made of angle iron, and has its lower end $b$, flared to form the wedge portion $w$, as shown in Fig. 1, so that when the rack arm is placed in a vertical position the arm tightly binds between the extending ear 3' shown in Fig. 2, and the side of the wagon box, the hook 16 resting against the bracket section 5. When the brackets are thrown up in this manner, a dock rack is formed, in that the brackets are provided with suitable slats, $v$, as shown.

The rack arms have two flanges, 10 and 11, as disclosed in Fig. 3, between which near the upper ends is held the stop block 13, while near the lower end is held by means of the pin $x$, the stay B, to which is secured the plate 15, ending in a securing eye above to engage the bolt $x$, and the hook 12 at the lower end. When the brackets are adjusted so that the wagon is provided with a hay or straw rack, the slats are in the position as indicated in Fig. 1, in which condition the hook 12 rests against the section 5 and resting upon the bottom portion 6. A second adjustment of the rack may be obtained in carrying the hook upon the section 1, and against the stop end 8. The rack arms and stays can be readily removed, in simply carrying upward the arms so that the hooks 16 will pass out beyond the ears 3 and 3'.

The device is both light and inexpensive and may be attached to any ordinary farm wagon.

And having thus described my said invention, what I claim is;

In a device of the character described, the combination with a bracket having a vertically disposed stop end and upper recurved loop-forming portion, of a rack arm having a terminal hook adapted to work within said recurved loop, and a hook provided stay pivotally secured to said arm and adapted to work within the lower horizontal portion of said bracket, and against said stop end, as and for the purpose set forth.

In testimony whereof I affix my signature, in presence of two witnesses.

JOHN KAMINSKI.

Witnesses:
 WILLIAM J. BUER,
 FRANK. KAMINSKI.